Aug. 2, 1960  F. B. ODDIE  2,947,213
OPTICAL APPARATUS FOR CHECKING BORE-CROSS-SECTIONS
Filed Dec. 23, 1957  4 Sheets-Sheet 1
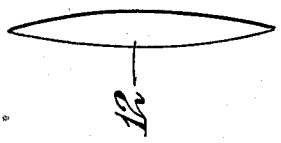
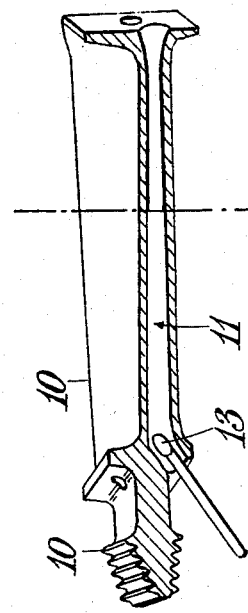
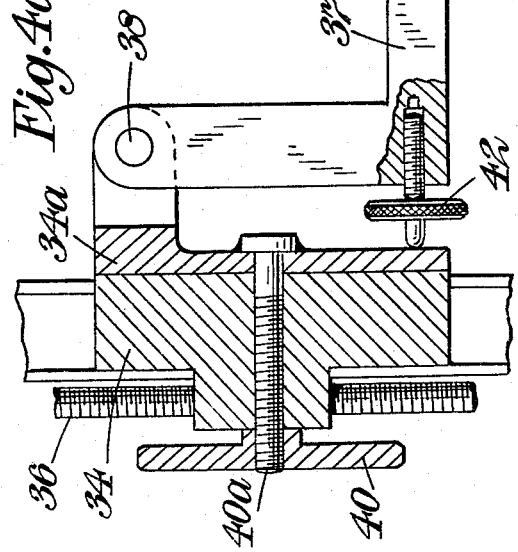
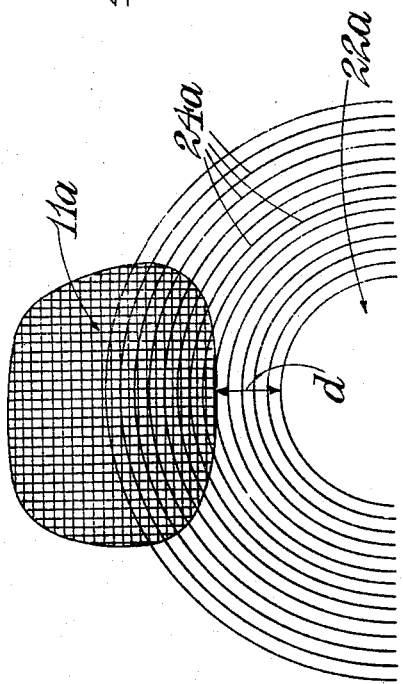

Aug. 2, 1960  F. B. ODDIE  2,947,213
OPTICAL APPARATUS FOR CHECKING BORE-CROSS-SECTIONS
Filed Dec. 23, 1957  4 Sheets-Sheet 2
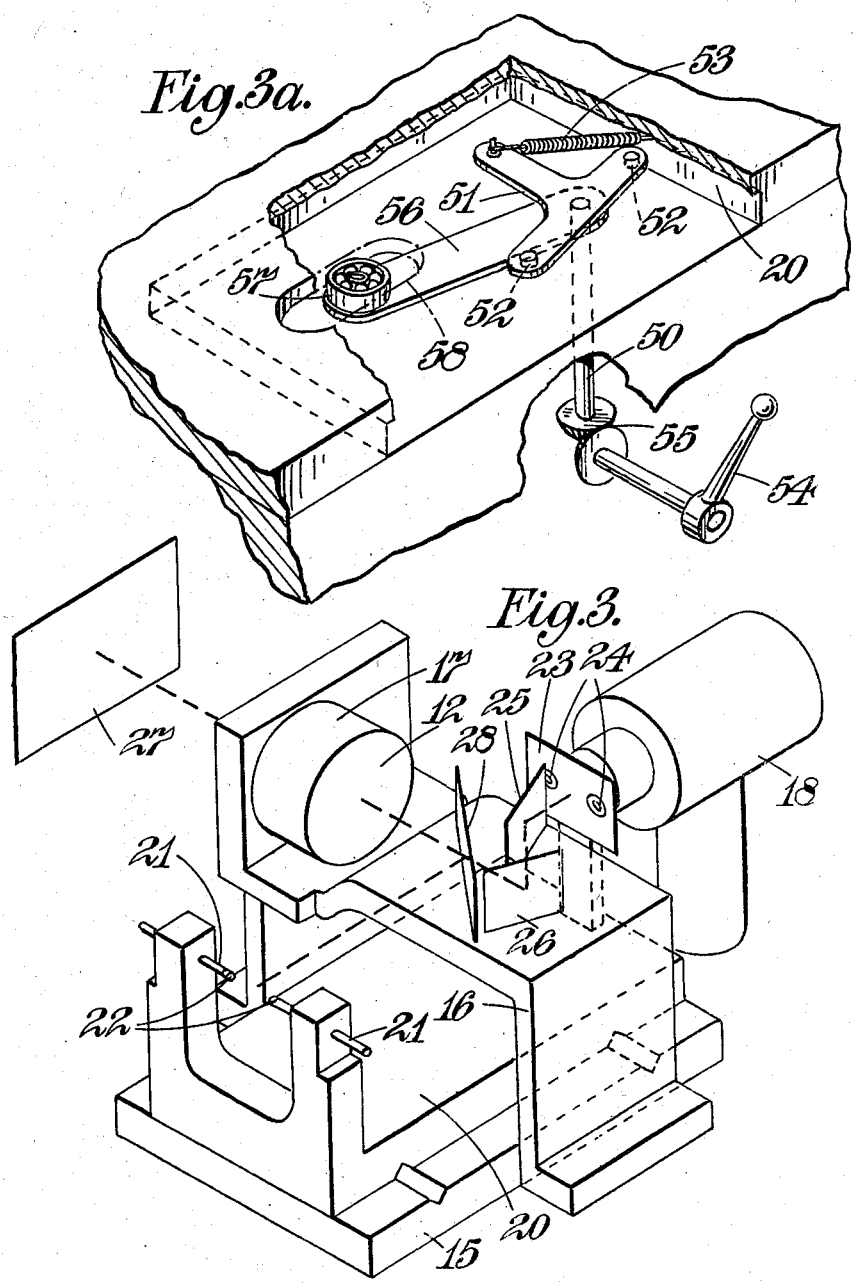

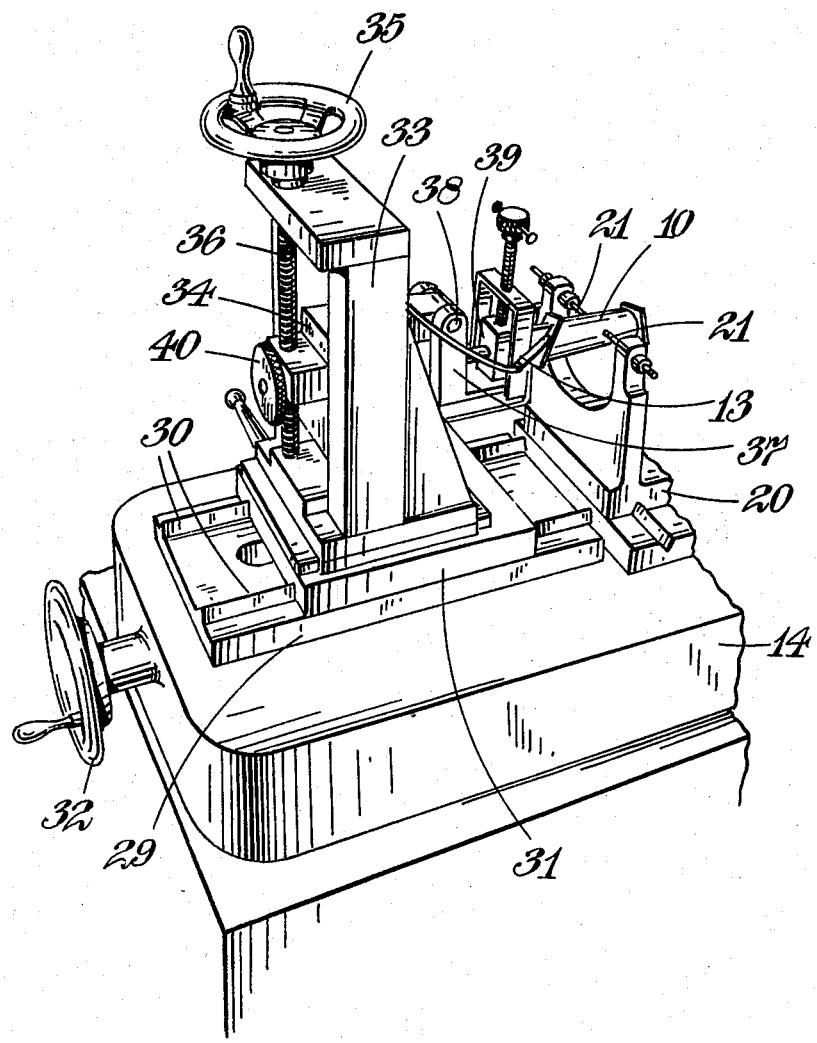

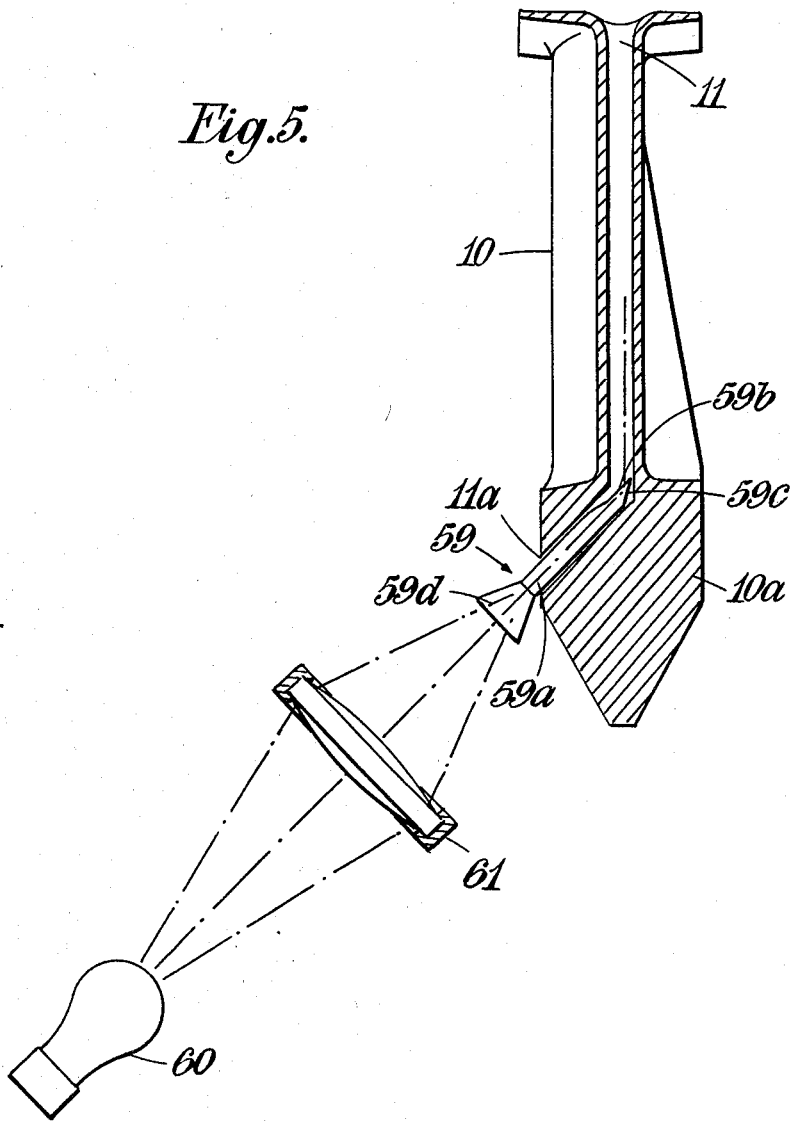

United States Patent Office 2,947,213
Patented Aug. 2, 1960

2,947,213

OPTICAL APPARATUS FOR CHECKING BORE-CROSS-SECTIONS

Fredrick Brian Oddie, Skipton, England, assignor to Rolls-Royce Limited, Skipton, England, a British company Filed Dec. 23, 1957, Ser. No. 704,702

Claims priority, application Great Britain Dec. 21, 1956

8 Claims. (Cl. 88—14)

This invention comprises improvements in or relating to optical measuring or checking apparatus and has for an object to provide a form of apparatus whereby the cross-section of a bore in an article may be checked or the wall thickness measured.

One important use of the apparatus is in checking hollow blades such as are employed in gas turbine engines in order to ensure that the wall thickness has not been reduced undesirably.

According to the present invention, optical measuring or checking apparatus comprises a lens of small depth of focus, means adapted to support the lens and the article to be checked with the bore in the article optically substantially aligned with the optical axis of the lens for adjusting the relative position of the lens and article whereby successive portions of the bore may be observed, and graticule means with which the observed image of the bore may be checked or measured.

Preferably, there is also provided a stylus which contacts the external surface of the article the position of the stylus being correlated with that of the graticule means whereby the position of the bore portion in view is determined. The graticule means and stylus may each be located optically at the focus of the lens, and their images may be projected on to a screen in superposed relation. In use of the apparatus, an outline of the bore level with the stylus will also be projected on to the screen and the outline is thus correlated as to position relative to the graticule through the medium of the stylus.

In one construction of apparatus, two such styli are mounted on a slide so that an article mounted in the apparatus extends between the styli whereby on adjustment of the slide one or other stylus contacts the adjacent surface of the article, and the graticule means comprises a graticule screen having a pair of target-like graticule inscriptions aligned respectively with the styli.

One embodiment of inspection apparatus of this invention will now be described with reference to the accompanying drawings in which:

Figure 1 illustrates the principle of operation of the apparatus;

Figure 2 illustrates the form of image seen in use;

Figure 3 illustrates a part of the apparatus;

Figure 3a illustrates a detail of the apparatus shown in Figure 3;

Figure 4 illustrates a second part of the apparatus;

Figure 4a illustrates a detail of the apparatus shown in Figure 4; and

Figure 5 illustrates a modification.

Referring to Figure 1, a hollow turbine blade is indicated at 10, the blade being positioned with its bore 11 on the optical axis of a lens 12. The bore 11 is illuminated internally by an intrascope bulb 13 and the bore may be coated with a thin layer of a white powder. The lens 12 is selected to be one with a short depth of focus and it has been found that a Zeiss Tessar f 4.5 lens at wide aperture is suitable for this purpose.

In examining the blade bore and wall thickness, the lens and blade are moved relatively lengthwise of the optical axis of the lens so bringing successive sections of the periphery of the bore of the blade into the focal plane of the lens. An image of the bore is presented on a screen and the image is correlated with a graticule as described below. In this manner the thickness of the blade wall and the shape of the bore may be checked.

Referring now to Figures 2 to 4, the apparatus illustrated comprises means to project images of the bore and of a suitable graticule on to a screen (Figures 3 and 3a) and means for supporting the blades (Figures 4 and 4a).

The apparatus comprises a main fixed table 14 (Figure 4) on which the parts of the apparatus are mounted. The optical apparatus (Figure 3) comprises a flat base 15, a bridge structure 16 straddling the base 15 and carrying the lens 12 in a suitable mounting 17, a mirror system, a lamp housing 18, and a slide 20 on which are mounted at one end a pair of styli 21 having hemispherical tips 22 and at the opposite end (and adjacent the lamp housing 18) a graticule screen 23.

The slide 20 is slidable on the base 15 in a direction parallel to the optical axis of the lens 12 and preferably means is provided to enable the slide 20 to be lightly spring-loaded to move in one direction or the other at the will of the operator. The loading means may comprise (Figure 3a) a spindle 50 to which is secured a T-shaped lever 51 carrying a pair of pins 52, one on each of its opposite limbs, and a tension spring 53 anchored at one end to the slide 20 and at its other end to the end of the third limb of the lever 51. The lever 51 is rotatable by a handle 54 through bevel gears 55. A further lever 56 is freely mounted by one end on the spindle 50 and carries at its other end a ball bearing 57 the outer race of which works in a slot 58 in the slide 20. By rotating the lever 51, one or the other of the pins 52 engages the lever 56, and thereby the tension spring 55 loads the lever 56 into engagement with one side or the other of slot 58 so biasing the slide 20 towards the lens 12 or away from it.

The graticule screen 23 (Figure 3) has inscribed on it a pair of target-like graticules 24, each of which graticules 24 consists of a number of concentric circles the innermost of which has the same diameter as the hemispherical tips 22 of the styli 21. The centre of each graticule 24 is aligned with the centre of the hemispherical tip 22 of the corresponding stylus 21. The spacing of the circles forming the graticules may for example be .010".

The mirror system illustrated comprises a pair of mirrors 25, 26 and a half silvered mirror 28. The graticule screen 23 is located optically at the focus of the lens 12 and is illuminated by the lamp in the lamp housing 18 from the rear. Images of the graticules are projected, after reflection by mirrors 25, 26, through the lens 12 on to a screen 27. Likewise an image (which appears as a shadow) of each stylus 22 is projected after reflection by the half silvered transmission mirror 28 through the lens 12 on to the screen 27, the stylus also being located at the focus of lens 12. The mirrors 25, 26 and 28 are set so that the shadows of the styli tips 22 coincide with the images of the centre circles of the graticules 24.

Referring to Figures 4 and 4a, the apparatus for supporting the blade comprises a base-plate 29 secured on to the table 14 and formed with guides 30 at right angles to the direction of movement of the slide 20. A saddle 31 slides on the guides 30 under the control of a handwheel 32, and a vertical guide frame 33 is mounted on the saddle 31. A block 34 is slidable in the guide frame 33 under the control of a hand-wheel 35 and threaded shaft 36, the direction of sliding of the block thus being at right angles to both the direction of travel of the slide 20 and the direction of travel of saddle 31. Block 34 has a plate member 34a mounted on its face remote from the threaded shaft 36, the plate 34a being rotatable relative to the block about the axis of a pin 40a (Figure 4a) which is threaded and has on it a knurled knob 40. The axis of the pin is parallel to the direction of movement of saddle 31. This arrangement permits rotational adjustment of the plate 34a relative to the block 34, and the knurled knob is used to lock the block 34 and plate 34a together after relative adjustment. A U-bracket 37 is pivoted at 38 by the end of one limb to the plate 34a and the bracket 37 carries a clamp 39 which is adapted to grip the root end 10a of the blade 10 which is to be examined. The bracket 37 is rockable about its pivot 38 to tilt the blade 10, the tilting being effected by means of a knob 42 (Figure 4a) which is screwed in the bracket 37 and abuts against the plate 34a. The axis of pivot 38 is parallel to the direction of movement of slide 20.

In use, a blade 10 is secured in the clamp 39 and its position is adjusted by adjusting the handwheel 35, the plate 34a and knob 42 until the axis of the bore 11 in the blade 10 is optically aligned with the optical axis of lens 12 and an image of the bore 11 is transmitted by the mirror 28 and the lens 12 onto the screen 27. The slide 20 is now spring loaded operating lever 54 to bring one of the styli tips 22 into contact with a surface of the blade 10, say the convex surface of the blade and an image will then be seen on the screen for example as illustrated in Figure 2. In Figure 2, 22a is the image of the tip 22 of the stylus 21 which is in contact with the blade, the circles 24a are the image of the associated graticule 24 and the area 11a is the image of the cross-section of the bore 11 in the blade level with the stylus 21, the remaining parts of the bore being out of focus. The distance d represents the thickness of the blade wall at the point of contact of the stylus 21.

By moving the saddle 31 along its guides 30 so moving the blade lengthwise of itself the whole length of the bore may be inspected. Also by raising and lowering the block 34, the thickness of the blade wall at different points in any cross-section can be measured. Further by operating lever 54 to reverse the spring loading, the slide 20 is biased in the opposite sense and the other stylus tip 22 is brought into contact with the other surface of the blade so that the thickness of the blade wall over the surface can be investigated.

In the modification shown in Figure 5, in order to get more light into the bore 11, the intrascope bulb 13 is replaced by a transparent plug-shaped member 59 having a generally cylindrical part 59a which is a clearance fit in the root end 11a of the blade hole and terminates at one end in two flat faces 59b and 59c and, at the other end, in a frusto conical portion 59d. A high intensity source of light, such as a 250 watt mercury-vapour lamp is indicated diagrammatically at 60. Between the lamp 60 and plug 59 is situated a converging lens 61 which serves to concentrate the light on to the plug. The concentrated beam of light is deflected by the prism-shaped end of the plug around the angle of the bore 11.

I claim:

1. Optical measuring or checking apparatus for use in the inspection of the cross section of a bore in an article, which apparatus comprises a light source insertable in the bore to be illuminated, a graticule means, a stylus, an optical system including a lens of small depth of focus and mirror means by which images of the bore of the article, the graticule means and the stylus are reflected through the lens, a first support carrying the optical system, a second support wherein the article to be checked is mounted with the bore of the article optically substantially aligned with the optical axis, whereby an image of a cross section of the bore is transmitted through the lens, said first and second supports being adjustable relative to one aonther enabling images of the cross section of successive portions of the bore to be transmitted through the lens, said graticule means enabling the image of the bore to be checked or measured, a third support carrying said graticule means and said stylus in fixed relation to one another and in positions relative to said mirror means permitting said mirror means to reflect images thereof through the lens, said stylus being adjacent said second support and having a portion for contacting the external surface of an article carried in the second support, and a screen positioned to receive from the optical system images of the bore cross section, the graticule means and the stylus in superimposed relation.

2. Optical measuring or checking apparatus for use in the inspection of the cross section of a bore in an article, which apparatus comprises a light source insertable in the bore to be illuminated, an optical system having an optical axis and including a lens of small depth of focus and mirror means in alignment with said axis, a first support carrying the optical system, a second support wherein the article to be checked is mounted with the bore of the article optically substantially aligned with the optical axis, whereby an image of a cross section of the bore is transmitted through the lens, said first and second supports being adjustable relative to one another enabling images of the cross sections of successive portions of the bore to be transmitted through the lens, graticule means with which the image of the bore may be checked or measured, a stylus, a third support carrying said graticule means and said stylus in fixed relation to one another and in positions relative to said mirror means permitting said mirror means to reflect images thereof through the lens, said stylus being adjacent said second support and having a portion for contacting the external surface of an article carried in the second support, said mirror means including a semi-transparent mirror inclined with respect to said axis and two additional mirror means also inclined with respect to said axis, said semi-transparent mirror serving to reflect the image of the bore cross section and the stylus through the lens and to transmit the image of the graticule reflected by said additional mirror means toward the lens, and a screen positioned to receive from the optical system images of the bore cross section, the graticule means and the stylus in superimposed relation.

3. Optical measuring or checking apparatus for use in the inspection of the cross section of a bore in an article, which apparatus comprises a light source insertable in the bore to be illuminated, a graticule means, a stylus, an optical system including a lens and mirror means by which images of the bore of the article, the graticule means and the stylus are reflected through the lens, a first support carrying the optical system, a second support wherein the article to be checked is mounted with the bore of the article optically substantially aligned with the optical axis, whereby an image of a cross section of the bore is transmitted through the lens, said first and second supports being adjustable relative to one another enabling images of the cross section of successive portions of the bore to be transmitted through the lens, said graticule means enabling the image of the bore to be measured, a third support carrying said graticule means and said stylus in fixed relation to one another and in positions relative to said mirror means permitting said mirror means to reflect images thereof through the lens, said stylus being adjacent said second support and having a portion for contacting the external surface of an article carried in the second support, said lens being of small depth of focus, said mirror means in said optical system including a semi-transparent mirror inclined with respect to said axis and two additional mirror means also inclined with respect to said axis, said semi-transparent mirror serving to reflect the images of the bore cross section and the stylus through the lens and to transmit the image of the graticule reflected by said additional mirror means towards the lens, and a screen positioned to receive from the optical system images of the bore cross section, the graticule means and the stylus in superimposed relation.

4. Optical measuring or checking apparatus according to claim 1, comprising a second stylus, said third support including a slide, said first and second styli being mounted on the slide in spaced relation one on each side of an article mounted in the second support, the slide being movable to bring one or other stylus into contact with the adjacent surface of the article, the graticule means also being mounted on the slide to move therewith and comprising a graticule screen having a pair of target-like graticule inscriptions aligned respectively with the styli.

5. Optical measuring or checking apparatus according to claim 4, the styli and graticule screen being at opposite ends of the slide, and the first support further comprising a bridge member straddling the slide and carrying the optical system including the lens, the optical axis of the lens being parallel to the direction of movement of the slide, and the optical system including mirror means by which images of the bore of the article, the graticule means and the styli are reflected through the lens.

6. Optical measuring or checking apparatus according to claim 5, comprising also spring-means co-operating with the slide to bias the slide in one direction or the other of its movement and manually-operated means to reverse the direction of the bias.

7. Optical measuring or checking apparatus according to claim 5, further comprising means adjustable selectively to load the slide to move in one direction or in the opposite direction, said means including a first lever pivoted at one end and engaging the slide by its opposite end, a T-shaped lever having a pair of oppositely-extending limbs and a third limb extending at right angles to said pair of limbs, the T-shaped lever being pivoted at the junction of its limbs to swing about the pivotal axis of the first lever, a pair of pins one at the end of each of said oppositely-extending limbs, said pins being brought selectively into contact with the first lever respectively on opposite sides thereof by swinging of the T-shaped lever, a biasing spring having a first anchorage on the slide and a second anchorage on the third limb and loading the T-shaped lever in a sense to urge the selected pin into contact with the first lever, and manually-operable means connected to effect selective swinging of the T-shaped lever in one direction or the other.

8. Optical measuring or checking apparatus according to claim 1, wherein the second support comprises a clamp adapted to grip the article and an adjustable support structure for the clamp, permitting adjustment of the position of the clamp rectilinearly in two directions which are mutually at right angles and are at right angles to the direction of movement of the slide, and rotationally about a pair of axes mutually at right angles, one of which is substantially parallel to the axis of the bore to be inspected.

References Cited in the file of this patent
UNITED STATES PATENTS

| | | |
|---|---|---|
| 2,221,154 | Soper | Nov. 12, 1940 |
| 2,378,870 | Soetbeer | June 19, 1945 |
| 2,488,146 | Steinhaus | Nov. 15, 1949 |
| 2,542,755 | Dietrich et al. | Feb. 20, 1951 |